(12) United States Patent
Huang et al.

(10) Patent No.: US 9,828,271 B2
(45) Date of Patent: Nov. 28, 2017

(54) MODIFIED ACTIVATED SLUDGE-BASED TWO-COMPARTMENT TREATMENT METHOD FOR PROCESSING NITRATE-CONTAMINATED DRINKING WATER AND THE DEVICE THEREOF

(71) Applicant: SHENYANG INSTITUTE OF APPLIED ECOLOGY, CHINESE ACADEMY OF SCIENCES, Liaoning (CN)

(72) Inventors: Bin Huang, Liaoning (CN); Jianlin Li, Liaoning (CN); Yi Shi, Liaoning (CN); Xin Chen, Liaoning (CN)

(73) Assignee: Shenyang Institute Of Applied Ecology, Chinese Academy of Sciences, Liaoning (CN)

( * ) Notice: Subject to any disclaimer, the term of this patent is extended or adjusted under 35 U.S.C. 154(b) by 148 days.

(21) Appl. No.: 14/646,561

(22) PCT Filed: Dec. 12, 2012

(86) PCT No.: PCT/CN2012/086426
§ 371 (c)(1),
(2) Date: May 21, 2015

(87) PCT Pub. No.: WO2014/082347
PCT Pub. Date: Jun. 5, 2014

(65) Prior Publication Data
US 2015/0284280 A1 Oct. 8, 2015

(30) Foreign Application Priority Data

Nov. 27, 2012 (CN) .......................... 2012 1 0494853

(51) Int. Cl.
*C02F 3/00* (2006.01)
*C02F 9/00* (2006.01)
(Continued)

(52) U.S. Cl.
CPC .............. *C02F 9/00* (2013.01); *C02F 3/305* (2013.01); *C02F 1/283* (2013.01); *C02F 1/50* (2013.01);
(Continued)

(58) Field of Classification Search
CPC .......... C02F 1/5236; C02F 1/50; C02F 1/283; C02F 1/78; C02F 9/00; C02F 3/305;
(Continued)

(56) References Cited

U.S. PATENT DOCUMENTS 4,069,148 A * 1/1978 Hutton .................. B01D 21/00
210/610
5,853,589 A * 12/1998 Desjardins ............ C02F 3/1263
210/605
(Continued)

FOREIGN PATENT DOCUMENTS

CN 1349934 A 5/2002
CN 102259978 A 11/2011
(Continued)

OTHER PUBLICATIONS

Gavazza dos Santos et al., Comparison of Methanol, Ethanol, and Methane as Electron Donors for Denitrification, 2004, Environ. Engineering Sci, vol. 21, No. 3, p. 313-320.*
(Continued)

*Primary Examiner* — Nam X Nguyen
*Assistant Examiner* — Julia L. Wun
(74) *Attorney, Agent, or Firm* — Smith, Gambrell & Russell, LLP

(57) ABSTRACT

Disclosed is a modified activated sludge-based two-compartment treatment method for processing nitrate-contaminated drinking water. Raw water is firstly sent to a first $TiO_2$-modified denitrifying activated sludge bioreactor (2), wherein organic carbon source is added in a controlled
(Continued)

amount, and nitrate is partly reduced with nitrite being accumulated. Then, the effluent from the first bioreactor is sent to a second $TiO_2$-modified denitrifying activated sludge bioreactor (3), wherein organic carbon source and hydrogen gas are supplemented, and remaining nitrate and accumulated nitrite are reduced to nitrogen gas. The denitrified effluent from the second bioreactor is sent to a settling tank (4), and $TiO_2$-containing precipitates collected from the settling tank receive sequential alkaline and acidic treatment before being injected into the first bioreactor (2) for $TiO_2$ recycling. The effluent from the settling tank (4), after having been subjected to ozone disinfection and activated carbon filtration, has suitable pH and bicarbonate alkalinity, and the concentrations of nitrate, nitrite and water soluble organics meet the safety standard for drinking water. Also disclosed is a modified activated sludge-based two-compartment treatment device for processing nitrate-contaminated drinking water.

15 Claims, 1 Drawing Sheet

(51) Int. Cl.
| | | |
|---|---|---|
| *C02F 3/30* | (2006.01) | |
| *C02F 1/28* | (2006.01) | |
| *C02F 1/78* | (2006.01) | |
| *C02F 3/28* | (2006.01) | |
| *C02F 101/16* | (2006.01) | |
| *C02F 1/50* | (2006.01) | |
| *C02F 1/52* | (2006.01) | |

(52) U.S. Cl.
CPC .............. *C02F 1/5236* (2013.01); *C02F 1/78* (2013.01); *C02F 3/282* (2013.01); *C02F 3/286* (2013.01); *C02F 2101/163* (2013.01); *C02F 2301/046* (2013.01); *C02F 2303/04* (2013.01); *C02F 2303/18* (2013.01)

(58) Field of Classification Search
CPC ...... C02F 3/282; C02F 2303/04; C02F 3/286; C02F 2303/18; C02F 2301/046; C02F 2101/163
See application file for complete search history.

(56) References Cited

U.S. PATENT DOCUMENTS

| | | | | |
|---|---|---|---|---|
| 6,719,902 | B1* | 4/2004 | Alvarez | B09C 1/002 |
| | | | | 210/170.07 |
| 6,884,354 | B1* | 4/2005 | Calltharp | C02F 3/1263 |
| | | | | 210/102 |
| 7,473,369 | B2* | 1/2009 | Meng | B01J 20/0211 |
| | | | | 210/665 |
| 7,682,815 | B2* | 3/2010 | Guiot | C02F 1/4676 |
| | | | | 435/262.5 |
| 2005/0035059 | A1* | 2/2005 | Zhang | B01D 61/04 |
| | | | | 210/605 |
| 2010/0282673 | A1* | 11/2010 | Ogawa | C02F 3/302 |
| | | | | 210/610 |
| 2011/0127214 | A1* | 6/2011 | Rico Martinez | C02F 3/30 |
| | | | | 210/605 |

FOREIGN PATENT DOCUMENTS

| | | |
|---|---|---|
| JP | 2006272172 A | 10/2006 |
| KR | 20050032269 A | 4/2005 |

OTHER PUBLICATIONS

Aziz et al., Landfill leachate treatment using powdered activated carbon augmented sequencing batch reactor (SBR) process: Optimization by response surface methodolgy, 2011, Journal of Haz. Mat. 189, p. 404-413.*

Written Opinion of the International Searching Authority for PCT/CN2012/086426 dated Aug. 29, 2013 (Chinese with English Translation).

"An heterotrophic/autotrophic denitrification (HAD) approach for nitrate removal from drinking water." Claudio Della Rocca, Vincenzo Belgiorno, Sureyya Meric. Process Biochemistry 41 (2006) 1022-1028.

International Search Report for PCT/CN2012/086426 dated Aug. 29, 2013 in English and Chinese language.

* cited by examiner

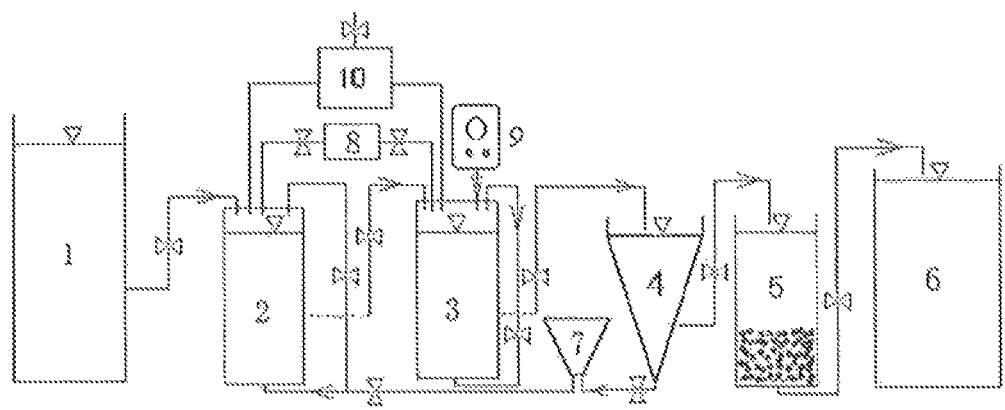

MODIFIED ACTIVATED SLUDGE-BASED TWO-COMPARTMENT TREATMENT METHOD FOR PROCESSING NITRATE-CONTAMINATED DRINKING WATER AND THE DEVICE THEREOF

FIELD OF THE INVENTION

The present invention relates to environmental protection, particularly to a modified activated sludge-based two-compartment treatment method for processing nitrate-contaminated drinking water and the device thereof.

BACKGROUND OF THE INVENTION

Nitrate contamination of drinking water is increasingly common in many countries, intake of nitrate induces the formation of nitrite in human body, which has harmful effects on human health. Therefore, reliable and efficient removal of nitrate in drinking water receives more and more attention.

Nitrate in drinking water may be removed by physical, chemical and biochemical methods. According to the types of electron donor, biochemical denitrification may be divided into two categories: autotrophic and heterotrophic denitrification. Common electron donors for autotrophic denitrification are elemental sulfur and hydrogen gas. Bacterial yield of autotrophic denitrification is low, so is its processing efficiency. Acidity and sulfate produced in sulfur-supported autotrophic denitrification may reduce the pH and the quality of the processed water. The use of calcium carbonate for adjusting the pH of such treated water will subsequently increase the water hardness. Secondary contamination derived from hydrogenotrophic denitrification is also relatively small, but the low solubility of hydrogen gas causes operational difficulties in transport/utilization of hydrogen gas and control of pH during hydrogenotrophic denitrification. So, it is not easy to operate hydrogenotrophic denitrification on large scale.

Compared to autotrophic denitrification, heterotrophic denitrification has a higher processing capability per unit volume. Fixed bed and fluidized bed bioreactors are commonly used for heterotrophic denitrification treatment of nitrate-contaminated drinking water. A fixed-bed bioreactor needs to overcome the problem of clogging in the long run. For a fluidized bed bioreactor, the operational cost is high to maintain a high processing ability. A conventional activated sludge-based approach, widely used for nitrate removal in wastewater treatment, is not readily suitable for nitrate removal from drinking water, mainly because it is poor at precise control of the addition of organic carbon source during denitrification and the formation of water soluble organic matter, suspended solids and residual nitrite in the produced water, and hard to meet the high requirements of drinking water.

Among various activated sludge-based approaches, operation of activated sludge in sequencing batch mode under automatic control is competitive in terms of controlling the quality of produced water and flexibility in operational scale. Activated sludge treatment of nitrate contaminated drinking water on large scale is possible, if taking proper measures to improve the settling property of conventional activated sludge, adopting an organic carbon-dominated and hydrogen gas-supplemented electron donor supply strategy, and operating in sequencing batch mode, in order to avoid excessive addition of organic carbon source and to reliably control the formation of water soluble organics, suspended solids and nitrite in the produced water.

DESCRIPTION OF THE INVENTION

The present invention provides a modified activated sludge-based two-compartment treatment method and a device for processing nitrate-contaminated drinking water. In this method, a first $TiO_2$-modified denitrifying activated sludge bioreactor is fed with nitrate-containing raw water and operates in sequencing batch mode under organic carbon source limited condition to partly reduce nitrate and accumulate nitrite; a second $TiO_2$-modified denitrifying activated sludge bioreactor is fed with the effluent from the first bioreactor, added with mixed organic carbon sources and hydrogen gas to support the cooperation of heterotrophic and hydrogenotrophic denitrification in order to completely reduce the remaining nitrate and the accumulated nitrite to nitrogen gas; the denitrified effluent from the second bioreactor is settled in a settling tank, disinfected with ozone, filtered with activated carbon, and finally becomes nitrate-removed drinkable water.

The denitrified effluent from the second bioreactor enters the settling tank, and $TiO_2$ containing precipitates collected from the settling tank are subject to sequential base and acid treatment before being transferred into the first bioreactor for $TiO_2$ recycling.

After 5-20 cycles of accumulation, the $TiO_2$-containing precipitates collected from the settling tank are sequentially treated with 10-50 mM NaOH and 10-50 mM HCl, and washed before being injected into the first bioreactor for $TiO_2$ recycling.

The $TiO_2$-modified denitrifying activated sludge used in the two bioreactors is prepared by gradually adding $TiO_2$ to conventional denitrifying activated sludge and culturing the sludge in sequencing batch mode until the sludge volume index (SVI) is 80 mL/g or less, the mass fraction of $TiO_2$ to total sludge is 20%-60%, and the sludge concentration is 3-6 g/L.

The first bioreactor is dosed with mixed organic carbon sources capable of removing 60%-85% of nitrate from the raw water through heterotrophic denitrification.

The second bioreactor is dosed with mixed organic carbon sources in a controlled amount capable of removing 0-30% nitrate from the raw water through heterotrophic denitrification, and the remaining need of electron donor is provided with hydrogen gas, to support the cooperation of heterotrophic and hydrogenotrophic denitrification.

The mixed organic carbon sources are composed of acetic acid and ethanol at a molar ratio of 4-2:1.

The hydrogen gas supplied during the cooperation of heterotrophic and hydrogenotrophic denitrification is intermittently provided by an electrolytic hydrogen production device, and intermittently pumped from the headspace of the bioreactor to its bottom to conduct intermittent anaerobic aeration.

A $TiO_2$-modified activated two-compartment treatment device for processing nitrate-contaminated drinking water comprises a raw water tank 1, a first $TiO_2$-modified heterotrophic denitrifying activated sludge bioreactor 2, a second $TiO_2$-modified heterotrophic and hydrogenotrophic denitrifying activated sludge bioreactor 3, a settling tank 4, an ozone disinfection and activated carbon filtration tank 5, a storage tank 6, a precipitates treatment tank 7, a concentrated organic carbon source tank 8, an electrolytic hydrogen production device 9, and a pressure regulating bag 10. The raw water tank 1, the first bioreactor 2, the second bioreactor 3, the settling tank 4, the filtration tank 5, and the storage tank 6 are sequentially connected through pipes. The concentrated organic carbon source tank 8 and the pressure regulating bag 10 are placed between the first bioreactor 2 and the second bioreactor 3.

The outlet of the electrolytic hydrogen production device 9 is connected to the headspace of the second bioreactor 3; one of the two outlets of the precipitates treatment tank 7 is connected to the settling tank 4, and the other outlet is connected to the first bioreactor 2; the concentrated organic carbon source tank 8 is connected to the first bioreactor 2 and the second bioreactor 3 by a peristaltic pump; the pressure regulating bag 10 is connected to the headspace of the first bioreactor 2 and the second bioreactor 3.

The whole system automatically operates in sequencing batch mode with drainage in a reverse order as follows: from the filtration tank 5 into the storage tank 6, from the settling tank 4 into the filtration tank 5, from the second bioreactor 3 into the settling tank 4, from the first bioreactor 2 into the second bioreactor 3, and from the raw water tank 1 into the first bioreactor 2. The $TiO_2$-containing precipitates collected from the settling tank 4 are transferred into the precipitates treatment tank 7, sequentially treated with base and acid, and transferred into the first bioreactor 2.

The invention divides the operation of denitrification into two compartments. Nitrate-contaminated raw water first enters the first bioreactor; and the nitrate is partially reduced and nitrite is accumulated through limiting the addition of organic carbon source. The effluent from the first bioreactor enters the second bioreactor, with the remaining nitrate and the accumulated nitrite being completely denitrified into nitrogen gas under sufficient supply of organic carbon source and hydrogen gas. The effluent from the second bioreactor enters the settling tank, and $TiO_2$-containing precipitates are collected from the settling tank, sequentially treated with base and acid and transferred into the first bioreactor for $TiO_2$ recycling. The effluent from the settling tank is disinfected with ozone and filtered with activated carbon, and finally has suitable levels of pH and carbonate alkalinity and acceptable levels of nitrate, nitrite and water soluble organics to meet the safety standard for drinking water. It is very suitable to use the $TiO_2$-modified activated sludge-based two-compartment denitrification method for processing nitrate contaminated drinking water on large scale.

The invention has the following advantages: i) $TiO_2$-modified activated sludge-based two-compartment denitrification can avoid organic carbon source excess during denitrification and effectively control the levels of residual nitrite, dissolved organic matter and suspended solids in the treated water; ii) $TiO_2$-modified activated sludge-based two-compartment denitrification suits large-scale processing of nitrate-contaminated drinking water.

BRIEF DESCRIPTION OF THE DRAWINGS

FIG. 1 is a schematic diagram of a modified activated sludge-based two-compartment treatment device used in examples for processing nitrate-contaminated drinking water.

EMBODIMENTS

Example 1

The device comprises a raw water tank 1, a first $TiO_2$-modified heterotrophic denitrifying activated sludge bioreactor 2, a second $TiO_2$-modified heterotrophic and hydrogenotrophic denitrifying activated sludge bioreactor 3, a settling tank 4, an ozone disinfection and activated carbon filtration tank 5, a storage tank 6, a precipitates treatment tank 7, a concentrated carbon source tank 8, an electrolytic hydrogen production device 9, and a pressure regulating bag 10.

The concentrated carbon source tank 8 is connected to the first bioreactor 2 and second bioreactor 3 by a peristaltic pump. The pressure regulating bag 10 is connected to the headspace of the first bioreactor 2 and the second bioreactor 3 to regulate their headspace pressures during water filling and drawing operation (The solenoid valve of the pressure regulating bag is open when the bag pressure is above 0.110 MPa and is closed when the bag pressure is below 0.105 MPa). The raw water tank 1, the first bioreactor 2, the second bioreactor 3, the settling tank 4, the filtration tank 5 and the storage tank 6 are sequentially connected through pipes. Water inflow and outflow of each component are controlled by solenoid valves. The first bioreactor 2 and the second bioreactor 3 are sequencing batch reactors. The filtration tank 5 has the functions of ozone disinfection and activated carbon filtration.

The outlet of the electrolytic hydrogen production device 9 is connected to the headspace of the second bioreactor 3. One of the two outlets of the precipitates treatment tank 7 is connected to the settling tank 4, and the other outlet is connected to the first bioreactor 2.

The whole system automatically operates in sequencing batch mode with drainage in a reverse order as follows: from the filtration tank 5 into the storage tank 6, from the settling tank 4 into the filtration tank 5, from the second bioreactor 3 into the settling tank 4, from the first bioreactor 2 into the second bioreactor 3, and from the raw water tank 1 into the first bioreactor 2. $TiO_2$-containing precipitates collected from the settling tank 4 are transferred into the precipitated treatment tank 7, sequentially treated with base and acid and transferred into the first bioreactor 2.

Setup of the Device

Each of the two bioreactors is cylinder-shape, with diameter 9 cm, height 100 cm, volume 6.4 L, and effective volume 5.7 L. The first bioreactor 2 is sealed and intermittently aerated with gas produced from denitrification and the second bioreactor 3 is sealed, and intermittently aerated with hydrogen gas provided by the electrolytic hydrogen production device 9. The settling tank 4 and the filtration tank 5 have the same size and shape as the two bioreactors. Water in the settling tank 4 was settled over 60 min ($TiO_2$-containing precipitates transferred into the precipitates treatment tank 7) and then drained into the filtration tank 5, in which, ozone disinfection was intermittently conducted (30 s disinfection, 2 min idling), altogether lasting 13 min. Afterwards, the water in the filtration tank 5 was slowly filtered through activated carbon into the storage tank 6.

$TiO_2$-modified denitrifying activated sludge was prepared by gradually adding $TiO_2$ into conventional denitrifying activated sludge, and culturing the sludge under sequencing batch mode as follows: the bioreactor had an effective volume of 20 L; the initial activated sludge concentration was about 2.5 g/L; culture temperature was 20-26° C.; nitrate concentration was 5 mM, acetic acid concentration was 2.5 mM, ethanol concentration was 1.0 mM. In each cycle of the operation (4-24 h duration), the bioreactor was intermittently mixed (0.5 min stirring, 4.5 min idling), settled for 1 h before sequential draining and filling of 10 L water. $TiO_2$-modified denitrifying activated sludge was obtained after weekly addition of $TiO_2$ at a rate of about 10% of active sludge for 6 weeks, with the sludge volume index (SVI) being about 70 mL/g.

Start-Up Phase of Operation

Prior to formal treatment of nitrate-containing raw water, the system operated in a start-up phase for 20 cycles. The bioreactor 2 and the bioreactor 3 both received 2.7 L of $TiO_2$-modified denitrifying activated sludge (10 g/L), wherein $TiO_2$ accounting for about 50% of the sludge mass. Then, the first bioreactor 2 was fed with 3 L of raw water (nitrate concentration 4.5 mM, pH 7.5, oxygen level 7.6-8.4 mg/L), and added with 40 mL of concentrated mixed organic carbon sources solution (107.2 mM acetic acid, 53.6 mM ethanol) through a peristaltic pump. The amount of mixed organic carbon sources added accounted for 68.4% of that required for completely removing nitrate from the raw water through heterotrophic denitrification. Water in the first bioreactor 2 was treated for 4 h for nitrate removal with intermittent anaerobic aeration (20 s anaerobic aeration, 9 min idling), settled for 40 min, and then drained (3 L) into the second bioreactor 3. And then the second bioreactor 3 was added with 12 mL of concentrated mixed organic carbon sources solution (107.2 mM acetic acid, 53.6 mM ethanol). The amount of mixed organic carbon sources added accounted for 20.5% of that required for completely removing nitrate from the raw water through heterotrophic denitrification. The second bioreactor was also added with 150 mL of hydrogen gas intermittently provided by the electrolytic hydrogen production device 9 (50 mL each time at a time interval of one hour, altogether 3 times), operated for nitrate and nitrite removal for 4 h with intermittent anaerobic aeration (20 s anaerobic aeration, 2 min idling). Then, water in the second bioreactor 3 was settled for 40 min and drained (3 L) into the settling tank 4. Water in the settling tank 4 was settled for 2 h, and then discharged 3 L water. The $TiO_2$-containing precipitates in the settling tank 4 were transferred into the precipitates treatment tank 7.

In the start-up phase of operation, the water discharged from the settling tank 4 was neither disinfected with ozone nor filtered through activated carbon. The entire system operated for 5 h for each cycle in sequencing batch mode with water drainage in a reverse order as follows: from the settling tank 4, from the second bioreactor 3 into the settling tank 4, from the first bioreactor 2 into the second bioreactor 3, and from the raw water tank 1 into the first bioreactor 2. The entire system operated for 20 cycles to complete the start-up phase. In addition, after 10 cycles of operation, $TiO_2$-containing precipitates collected from the settling tank 4 were sequentially treated with 40 mM NaOH and 20 mM HCl in the precipitates treatment tank 7, for 12 hours respectively, and then washed to neutral pH and injected into the first bioreactor 2. Formal operation When the start-up phase of operation was completed, the system formally operated to remove nitrate from raw water under room temperature condition (20-26° C.).

The first bioreactor 2 was fed with 3 L of raw water (42 mgN/L nitrate, pH 7.5, 2.2 mg/L water soluble organic carbon, 7.6-8.4 mg/L oxygen), and added with 27 mL of concentrated mixed organic carbon sources solution (107.2 mM acetic acid, 53.6 mM ethanol) through a peristaltic pump. The amount of mixed organic carbon sources added accounted for 69.2% of that required for completely removing nitrate from the raw water through heterotrophic denitrification. Water in the first bioreactor was treated for 120 min with nitrate being partially removed and nitrite accumulated due to shortage of organic carbon sources, settled for 30 min, and drained (3 L) into the second bioreactor 3. The second bioreactor was added with 7 mL of concentrated mixed organic carbon sources solution (107.2 mM acetic acid, 53.6 mM ethanol). The amount of mixed organic carbon sources added accounted for 18.0% of that required for completely removing nitrate from the raw water through heterotrophic denitrification. The second bioreactor was also added with 120 mL hydrogen gas intermittently provided by the electrolytic hydrogen production device 9 (30 mL each time at a time interval of 30 min, altogether 4 times), and operated for 120 min with intermittent anaerobic aeration (20 s anaerobic aeration, 2 min idling) for reducing the residual nitrate and accumulated nitrite into nitrogen gas. Then water in the second bioreactor was settled for 30 min and drained (3 L) into the settling tank 4. Water in the settling tank 4 was settled for 90 min and drained (3 L) into the filtration tank 5, and $TiO_2$-containing precipitates collected in the settling tank were transferred into the precipitates treatment tank 7. The water in the filtration tank 5 was intermittently disinfected by ozone (30 s disinfection, 2 min idling) for 15 min before 3 L of the disinfected water slowly flowed through the bottom-part activated carbon layer in 60 min into the storage tank 6 to complete one cycle of water processing. The entire system operated for 3 h for each cycle in sequencing batch mode with water drainage in a reverse order as follows: from the filtration tank 5 into the storage tank 6, from the settling tank 4 into the filtration tank 5, from the second bioreactor 3 into the settling tank 4, from the first bioreactor 2 into the second bioreactor 3, and from the raw water tank 1 into the first bioreactor 2. After 20 cycles of operation, $TiO_2$-containing precipitates collected from the settling tank 4 were sequentially treated with 40 mM NaOH and 20 mM HCl in the precipitates treatment tank 7, for 12 hours respectively, and then washed to neutral pH and injected into the first bioreactor 2. The whole system operated stably. The contents of nitrate, nitrite and soluble organic carbon (SOC) in the final effluent collected in the storage tank 6 met the safety requirements of drinking water and the water pH and bicarbonate alkalinity were suitable (Table 1).

TABLE 1

Changes in water quality of nitrate-contaminated drinking water before and after 3 h-treatment with the two-compartment nitrate removal system

|  | pH | Alkalinity (mM) | SOC (mg/L) | $NO_3$—N (mg/L) | $NO_2$—N (mg/L) |
|---|---|---|---|---|---|
| Before | 7.7 | 3.9 | 2.2 | 42 | 0 |
| After | 8.2 | 6.8 | <4.0 | <2.0 | <0.02 |

Example 2

Raw water nitrate level was 42 mgN/L; the first bioreactor operated for 110 min and settled for 30 min before drainage; the second bioreactor operated for 110 min and settled for 30 min before drainage; the settling tank 4 settled for 90 min before drainage; the whole duration of each cycle of operation was controlled to be 2.5 h; the other operation conditions were same as described in Example 1. The results after treatment are shown in Table 2.

TABLE 2

Changes in water quality of nitrate-contaminated
drinking water before and after 2.5 h-treatment
with the two-compartment nitrate removal system

|        | pH  | Alkalinity (mM) | SOC (mg/L) | $NO_3$—N (mg/L) | $NO_2$—N (mg/L) |
|--------|-----|-----------------|------------|-----------------|-----------------|
| Before | 7.7 | 3.9             | 2.2        | 42              | 0               |
| After  | 8.2 | 6.58            | <4.0       | <2.0            | <0.02           |

Example 3

Raw water nitrate level was 35 mgN/L. The first bioreactor was added with 20 mL of concentrated mixed organic carbon sources solution (125.0 mM acetic acid, 41.7 mM ethanol). The amount of mixed organic carbon sources added accounted liar 61.5% of that required for completely removing nitrate from raw water through heterotrophic denitrification. Water in the first bioreactor 2 was treated for 80 min for nitrate removal with intermittent anaerobic aeration (20 s anaerobic aeration, 4 min idling), settled for 30 min, and then drained (3 L) into the second bioreactor 3. The second bioreactor 3 was added with 7 mL of concentrated mixed organic carbon sources solution (125.0 mM acetic acid, 41.7 mM ethanol). The amount of mixed organic carbon sources added accounted for 21.5% of that required for completely removing nitrate from raw water through heterotrophic denitrification. The second bioreactor 3 was also added with 120 mL of hydrogen gas intermittently provided by the electrolytic hydrogen production device 9 (40 mL each time at a time interval of 30 min, altogether 3 times), operated for nitrate and nitrite removal for 80 mM with intermittent anaerobic aeration (15 s anaerobic aeration, 1 min idling). Then, water in the second bioreactor 3 was settled for 30 min and drained (3 L) into the settling tank 4. Water in the settling tank 4 was settled for 90 min, and then discharged (3 L). The other operating conditions were same as described in Example 1. The duration of each cycle of operation was controlled to be 2 h. The treatment system was stable, and the results after treatment are shown in Table 3.

TABLE 3

Changes in water quality of nitrate-contaminated
drinking water before and after 2 h-treatment with
the two-compartment nitrate removal system

|        | pH  | $HCO_3^-$ (mM) | SOC (mg/L) | $NO_3$—N (mg/L) | $NO_2$—N (mg/L) |
|--------|-----|----------------|------------|-----------------|-----------------|
| Before | 7.7 | 3.9            | 2.2        | 35              | 0               |
| After  | 8.2 | 6.4            | <4.0       | <2.0            | <0.02           |

Example 4

Raw water nitrate level was 28 mgN/L. The first bioreactor was added with 16 mL of concentrated mixed organic carbon sources solution (136.4 mM acetic acid, 34.1 mM ethanol). The amount of mixed organic carbon sources added accounted for 61.5% of that required for completely removing nitrate from raw water through heterotrophic denitrification. Water in the first bioreactor 2 was treated for 50 min with intermittent anaerobic aeration (2.0 anaerobic aeration, 4 min idling), settled for 30 min, and then drained (3 L) into the second bioreactor 3. The second bioreactor 3 was added with 240 mL hydrogen gas intermittently provided by the electrolytic hydrogen production device 9 (80 mL each time at a time interval of 15 min, altogether 3 times), operated for nitrate and nitrite removal for 50 min with intermittent anaerobic aeration (20 s anaerobic aeration, 9 min idling). Then, water in the second bioreactor 3 was settled for 30 min and drained (3 L) into the settling tank 4. Water in the settling tank 4 was settled for 60 min, and then discharged (3 L). The other operating conditions were the same as described in Example 1. The duration of each cycle of operation was controlled to be 1.5 h. The treatment system was stable, and the results after treatment are shown in Table 4.

TABLE 4

Changes in water quality of nitrate-contaminated
drinking water before and after 1.5 h-treatment
with the two-compartment nitrate removal system

|        | pH  | $HCO_3^-$ (mM) | SOC (mg/L) | $NO_3$—N (mg/L) | $NO_2$—N (mg/L) |
|--------|-----|----------------|------------|-----------------|-----------------|
| Before | 7.7 | 3.9            | 2.2        | 28              | 0               |
| After  | 8.1 | 5.9            | <3.0       | <2.0            | <0.02           |

We claim:

1. A modified activated sludge-based two-compartment treatment method for processing nitrate-contaminated drinking water, comprising:
    operating a first $TiO_2$-modified denitrifying activated sludge bioreactor in sequencing batch mode with nitrate-containing raw water as the feed, and the addition of mixed organic carbon sources to partly reduce nitrate and to accumulate nitrite through heterotrophic denitrification;
    operating a second $TiO_2$-modified denitrifying activated sludge bioreactor with effluent from said first bioreactor as feed, and with the addition of mixed organic carbon sources and hydrogen gas to further reduce remaining nitrate and accumulated nitrite to nitrogen gas through cooperation of heterotrophic and hydrogenotrophic denitrification;
    settling denitrified effluent from said second bioreactor in a settling tank; and
    filtering effluent from said settling tank for ozone disinfection and activated carbon filtration to obtain nitrate-removed drinkable water.

2. The modified activated sludge-based two-compartment treatment method for processing nitrate-contaminated drinking water of claim 1, further comprising:
    collecting $TiO_2$-containing precipitates from said settling tank;
    sequentially subjecting collected $TiO_2$-containing precipitates to base and acid treatments; and
    injecting treated $TiO_2$-containing precipitates into said first bioreactor for $TiO_2$ recycling.

3. The modified activated sludge-based two-compartment treatment method for processing nitrate-contaminated drinking water of claim 2, wherein
    said collected $TiO_2$-containing precipitates are subjected to the sequential base and acid treatments after 5-20 cycles of accumulation,
    said sequential base and acid treatments comprise treating the collected $TiO_2$-containing precipitates with 10-50 mM NaOH and 10-50 mM HCl, and said treated TiO$_2$-containing precipitates are washed before being injected into said first bioreactor for recycling.

4. The modified activated sludge-based two-compartment treatment method for processing nitrate-contaminated drinking water of claim 2, further comprising:
preparing the TiO$_2$-modified denitrifying activated sludge in said first and second bioreactors by gradually adding TiO$_2$ to denitrifying activated sludge, and culturing the sludge in sequencing batch mode until the sludge volume index (SVI) is 80 mL/g or less, the mass fraction of TiO$_2$ to total sludge is 20%-60%, and the sludge concentration is 3-6 g/L.

5. The modified activated sludge-based two-compartment treatment method for processing nitrate-contaminated drinking water of claim 1, wherein said first bioreactor is dosed with mixed organic carbon sources in a controlled amount capable of removing 60%-85% of nitrate from said raw water through heterotrophic denitrification.

6. The modified activated sludge-based two-compartment treatment Method for processing nitrate-contaminated drinking water of claim 1, wherein
said second bioreactor is dosed with mixed organic carbon sources in a controlled amount capable of removing 0-30% nitrate from said raw water through heterotrophic denitrification, and
said second bioreactor is dosed with hydrogen gas in a controlled amount capable of reducing residual nitrate and accumulated nitrite through the cooperation of heterotrophic and hydrogenotrophic denitrification.

7. The modified activated sludge-based two-compartment treatment method for processing nitrate-contaminated drinking water of claim 1, wherein said mixed organic carbon sources added to the first and second bioreactors are composed of acetic acid and ethanol at a molar ratio of 4:1 to 2:1.

8. The modified activated sludge-based two-compartment treatment method for processing nitrate-contaminated drinking water of claim 1, wherein
said hydrogen gas supplied during operation of said second bioreactor is intermittently pumped by an electrolytic hydrogen production device from a headspace to a bottom of said second bioreactor to conduct intermittent anaerobic aeration.

9. A device for processing nitrate-contaminated drinking water, comprising:
a raw drinking water tank;
a first TiO$_2$-modified heterotrophic denitrifying activated sludge bioreactor;
a second TiO$_2$-modified heterotrophic and hydrogenotrophic denitrifying activated sludge bioreactor;
a settling tank;
an ozone disinfection and activated carbon filtration tank;
a storage tank;
a precipitates treatment tank;
a concentrated organic carbon source tank;
an electrolytic hydrogen production device; and
a pressure regulating bag, wherein
said raw drinking water tank, said first TiO$_2$-modified heterotrophic denitrifying activated sludge bioreactor, said second TiO$_2$-modified heterotrophic and hydrogenotrophic denitrifying activated sludge bioreactor, said settling tank, said filtration tank, and said storage tank are sequentially connected through pipes,
said concentrated organic carbon source tank comprises a first feed line connected to said first TiO$_2$-modified heterotrophic denitrifying activated sludge bioreactor and a second feed line connected to said second TiO$_2$-modified heterotrophic and hydrogenotrophic denitrifying activated sludge bioreactor, and
said pressure regulating bag comprises a first pressure line connected to said first TiO$_2$-modified heterotrophic denitrifying activated sludge bioreactor and a second pressure line connected to said second TiO$_2$-modified heterotrophic and hydrogenotrophic denitrifying activated sludge bioreactor.

10. The device of claim 9, wherein
an outlet of hydrogen gas from said electrolytic hydrogen production device is connected to a headspace of said second TiO$_2$-modified heterotrophic and hydrogenotrophic bioreactor,
an inlet of said precipitates treatment tank is connected to said settling tank, and an outlet of said precipitates tank is connected to said first TiO$_2$-modified heterotrophic denitrifying activated sludge bioreactor,
said concentrated organic carbon source tank is connected to said first TiO$_2$-modified heterotrophic denitrifying activated sludge bioreactor and said second heterotrophic and hydrogenotrophic bioreactor by a peristaltic pump, and
said pressure regulating bag is connected to said first TiO$_2$-modified heterotrophic denitrifying activated sludge bioreactor and said second TiO$_2$-modified heterotrophic and hydrogenotrophic bioreactor by pipes.

11. A method for processing nitrate-contaminated drinking water, comprising:
operating the device of claim 9 in sequencing batch mode with drainage in a reverse order as follows:
from said filtration tank into said storage tank,
from said settling tank into said filtration tank,
from said second bioreactor into said settling tank,
from said first bioreactor into said second bioreactor, and
from said raw drinking water tank into said first bioreactor, and
collecting TiO$_2$-containing precipitates from said settling tank, transferring the collected TiO$_2$-containing precipitates into said precipitates treatment tank, sequentially subjecting said transferred precipitates to base and acid treatments, and transferring said treated precipitates into said first bioreactor.

12. The modified activated sludge-based two-compartment treatment method for processing nitrate-contaminated drinking water of claim 1, wherein the second bioreactor is operated to denitrify the effluent from said first bioreactor to completely reduce all remaining nitrate and all accumulated nitrite to nitrogen gas.

13. The device of claim 9, wherein
the sequentially connected components are connected without an additional bioreactor therebetween.

14. The device of claim 13, wherein
the respective pipes joining the sequentially connected components comprise flow control valves.

15. The device of claim 9, wherein
said first feed line and said second feed line of said concentrated organic carbon source tank are independent of the pipes sequentially connecting said raw drinking water tank, said first TiO$_2$-modified heterotrophic denitrifying activated sludge bioreactor, and said second TiO$_2$-modified heterotrophic and hydrogenotrophic denitrifying activated sludge bioreactor.

* * * * *